United States Patent [19]
Wright et al.

[11] Patent Number: 5,593,599
[45] Date of Patent: *Jan. 14, 1997

[54] METHOD FOR INHIBITING MICROBIAL ADHESION ON SURFACES

[75] Inventors: J. Barry Wright; Daniel L. Michalopoulos, both of Jacksonville, Fla.

[73] Assignee: BetzDearborn Inc., Trevose, Pa.

[ * ] Notice: The term of this patent shall not extend beyond the expiration date of Pat. No. 5,512,186.

[21] Appl. No.: 638,631

[22] Filed: Apr. 26, 1996

Related U.S. Application Data

[63] Continuation-in-part of Ser. No. 430,569, Apr. 28, 1995, Pat. No. 5,512,186.

[51] Int. Cl.$^6$ ........................................... C02F 1/50
[52] U.S. Cl. ............................. 210/764; 210/698
[58] Field of Search ........................... 210/764, 928, 210/698

[56] References Cited

U.S. PATENT DOCUMENTS 4,348,954  9/1982  Okishi ..................... 524/166
4,589,985  5/1986  Yorke ..................... 210/699

FOREIGN PATENT DOCUMENTS 0354889  8/1989  European Pat. Off. .

OTHER PUBLICATIONS

W. K. Whitekettle, "Effects of Surface–Active Chemicals on Microbial Adhesion,", *Journal of Industrial Microbiology*, 7 (1991), pp. 105–116.

S. G. Hales, "Biodegredation of the Anionic Surfactant Dailkyl Sulphosuccinate," *Environmental Toxicology and Chemistry*, vol. 12, pp. 1821–1828, 1993.

*Primary Examiner*—Neil McCarthy
*Attorney, Agent, or Firm*—Alexander D. Ricci; Richard A. Paikoff

[57] ABSTRACT

A method for inhibiting the microbial adhesion on surfaces in contact with an aqueous system is disclosed, which comprises adding to the system a treatment comprising an alkylsulfosuccinate surfactant.

18 Claims, 3 Drawing Sheets

METHOD FOR INHIBITING MICROBIAL ADHESION ON SURFACES

This is a continuation-in-part of application Ser. No. 081430,569, filed Apr. 28, 1995 now U.S. Pat. No. 5,512, 186.

BACKGROUND OF THE INVENTION

Bacterial attachment to surfaces in virtually any non-sterile aquatic environment is a well-established phenomenon. Industrial efforts to prevent colonization or to clean fouled surfaces amount to costly expenditures in a number of industrial sectors. Often, such expenditures are made for cleaning programs that include the use of surfactants. Surfactants are regularly employed in water treatment programs as agents believed to play a role in the removal of organic masses from surfaces, in the enhancement of biocide efficacy or in the assistance in the water miscibility of various biocidal agents. Surfactants are also regularly used in the agrichemical business, particularly to enhance the action of herbicides. This is accomplished by using the surfactants to alter the surface behavior of the applied droplets, maximizing their interaction with the leaf surface.

There are numerous examples of surfactants which are able to inhibit the colonization of surfaces by inhibiting the overall growth of the organisms in the target environment. Most surfactants, regardless of class, show some inhibition of surface colonization when used at concentrations high enough to impede bacterial growth. In the water treatment industry, the most well known surfactants which impart a measure of colonization resistance to submerged surfaces are the cationic quaternary amine surfactants, which also function as biocides. However, even the relatively mild nonionic surfactants can exhibit toxic effects upon microbes, e.g., bacteria or fungi; the concentration of nonionic surfactants necessary to mediate toxicity is typically substantially higher than for cationic surfactants, however.

Examples of nontoxic control of surface colonization typically require the use of high concentrations of surfactants not feasible in water treatment industries where thousands or millions of gallons of water would be treated.

The present invention relates to the use of surfactants which act by inhibiting microbial adhesion to surfaces in contact with an aqueous system. The materials of the present invention have been previously used in areas such as fiber wetting in the textile industry. These materials function to inhibit adhesion at concentrations below which toxicity has been observed for the tested organisms.

DETAILED DESCRIPTION OF THE INVENTION

The present invention relates to a method for inhibiting the microbial colonization of surfaces in contact with an aqueous system, e.g., a cooling water, pulping or papermaking system, which comprises adding to said system an effective amount of an anionic alkylsulfosuccinate surfactant. The present invention prevents the adhesion of microbes to said surfaces while preserving the viability of the microbes in the process stream of said system, allowing for their discharge from the system.

Anionic sulfosuccinate surfactants with dialkyl chain lengths of from about 7–10 carbons (i.e., each chain containing 7–10 carbons) will be the most effective for purposes of the present invention. It is theorized that best efficacy will be achieved when the alkyl chain is minimally branched, with any occurring branching being at the distal end of the alkyl chain.

The method of the present invention demonstrates the ability of a surfactant to inhibit colonization of surfaces at concentrations below those that cause a reduction in the number of viable microbes, e.g., bacteria or fungi. This "environmentally friendly" control methodology prevents bacterial attachment without reducing the number of viable microbes. Furthermore, the class of chemicals (i.e., the alkylsulfosuccinates) involved in this non-toxic treatment of the present invention are biodegradable.

In order to demonstrate efficacy of the present invention, a method was developed which allowed for the screening of surfactant ability to inhibit the initial colonization steps. This method involved the colonization of commercially available stainless steel discs by bacteria in the presence/absence of surfactants. The number of bacteria on a set of discs was then determined by standard methods.

The bacterial species *Pseudomonas aeruginosa*, (*P. aeruginosa*) was the organism chosen for these studies because this species has frequently been demonstrated to be among the primary colonizers of submerged surfaces. These organisms are also nearly ubiquitous in natural aquatic environments and could, therefore, be expected to be found in the process water streams in a variety of industries; the strain used was a paper mill isolate.

Figure 1:
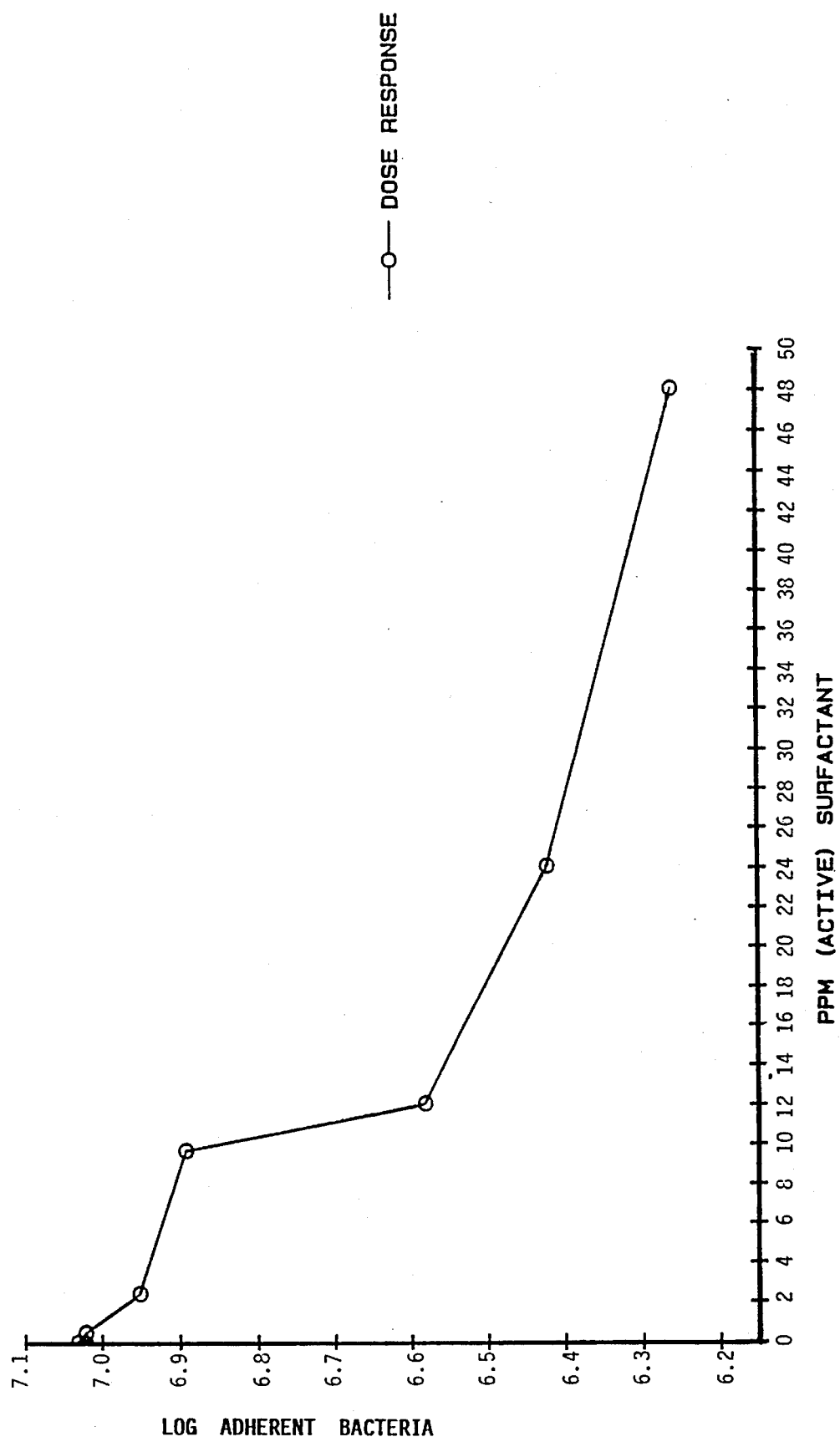
FIG. 1 illustrates the inhibition of *P. aeruginosa* colonization of stainless steel by dinonylsulfosuccinate.

Products seen to be effective at minimizing initial colonization were further examined for a dose response relationship to colonization inhibition. FIG. 1 shows the results of the dose-response assay, using the preferred product of the present invention, a dinonylsulfosuccinate, over a three hour colonization period.

Figure 2:
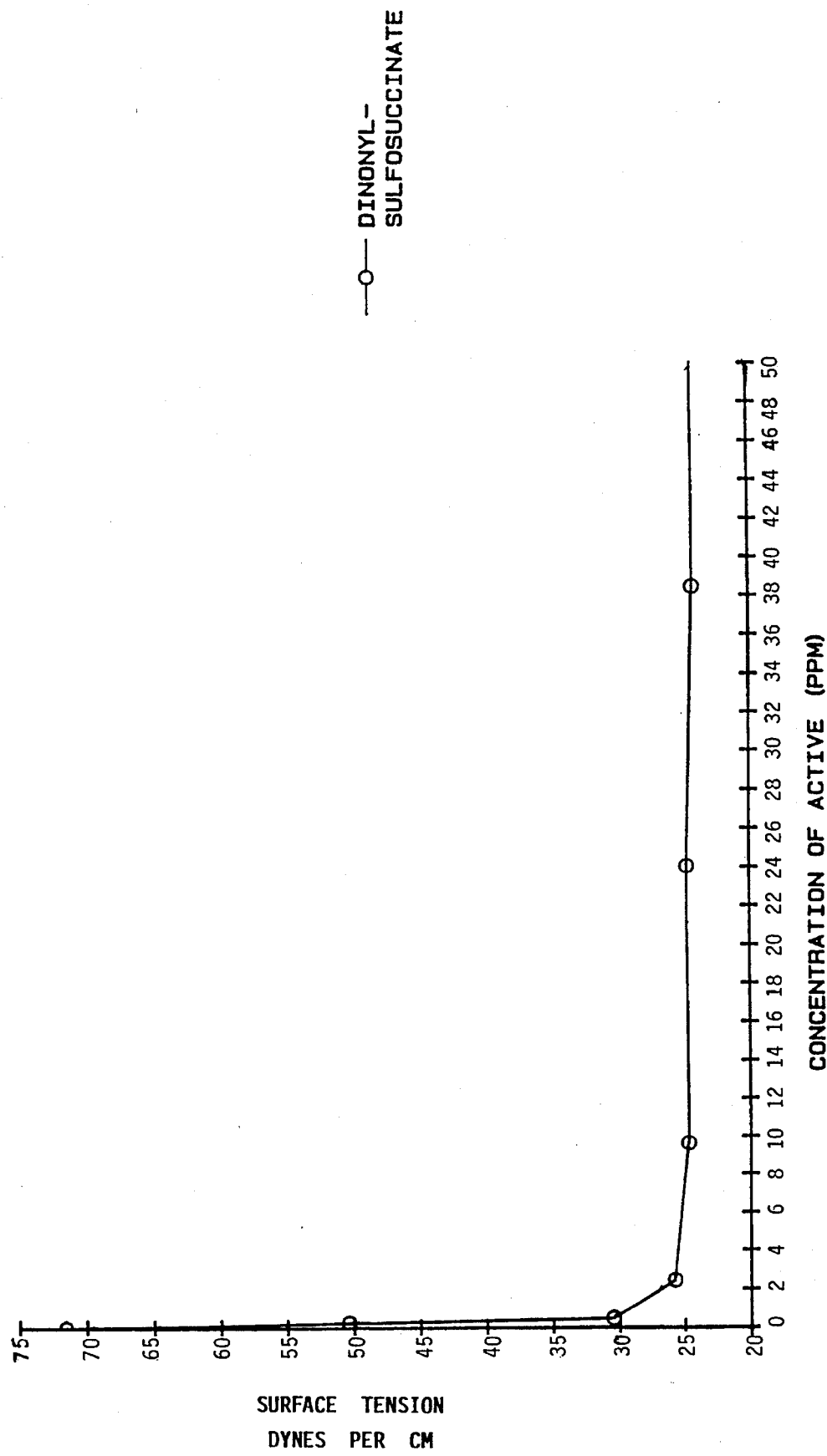
FIG. 2 illustrates the dynamic surface tension reduction through the addition of dinonylsulfosuccinate.

As surfactants are, by definition and in practice, compounds which reduce the surface tension of the media to which they are added, a correlation between surface tension reduction and inhibition of colonization was examined. As mentioned above, the stainless steel surface experiments were used to generate dose-response curves reflecting the extent of colonization inhibition using a variety of surfactants. Data were also generated relative to the decrease in surface tension of the media caused by the presence of the surfactants at concentrations used in the dose-response curves. These data are presented in FIG. 2. This figure demonstrates substantial decrease in surface tension mediated by as little as 0.5 ppm of the active product.

The preferred material of the present invention, while showing an immediate and sharp drop in surface tension at 0.5 ppm active ingredient, did not show a correspondingly sharp inhibition of colonization (FIG. 1). In addition, while the critical micelle concentration was about 2.8 ppm of the preferred material, the most pronounced drop in surface colonization was seen at concentrations between from about 10 to 12 ppm. There was, however a continued, though more modest, increase in the impedance of bacterial colonization, corresponding to increasing concentrations of the surfactant in the media.

Experiments were also carried out in order to examine whether the bacteria present in the stainless steel disc test system altered the surface tension by virtue of the potential production of biosurfactants. There was not any evidence of reduction in the surface tension of the media either as a direct result of the addition of the bacteria to the test system, or as a result of the growth of the bacteria during the course of the three hour experiment. This confirmed that the results of the preceding surface tension experiments were dependent upon the addition of the chemical surfactant.

In order to determine the effect of the addition of the surfactants on the interfacial tension between the media and the steel surfaces, contact angle experiments were conducted with the surfactant added to the media and applied to the surface of the stainless steel discs.

Experiments were carried out with the preferred compound of the present invention at a variety of concentrations, and the results indicated that a minimum contact angle (and maximum surface "wettability") was obtained with approximately 2.5 ppm of the surfactant. Therefore, these results lend further support to the contention that the observed decrease in surface colonization, in the presence of the preferred material of the present invention, is not strictly related to a physical interaction of the surfactant with either the media or the steel surfaces.

Following a demonstration of the ability of selected surfactants to impede colonization of stainless steel in a relatively static test system, the surfactants were examined for similar efficacy over longer periods of time. This was accomplished through the use of "long term" colonization assays in order to determine the efficacy of these products over a period of approximately 24 or more hours. Colonization recirculation loops with removable coupons were employed for this study. Cultures of bacteria, supplemented with the preferred surfactant of the present invention, were recirculated through the colonization devices and the extent of colonization of the steel surfaces was compared, over time, to a concurrently run control device; the overall systems operated under continuous culture conditions.

The time of action of the preferred surfactant of the present invention was greatly modified relative to that observed in the static tests. In these experiments, there was virtually no difference between the colonization of the two devices over the initial phase of colonization (first six hours). By about eight hours of colonization, there was a small difference in the extent of colonization. This difference was magnified by 30 hours where there was a noticeable 0.77 $\log_{10}$-order smaller population on the surfaces taken from the device being treated with the preferred surfactant. It is also important to note that the reduction in colonization is not mediated by a significantly toxic effect on the bacteria (see Table I).

TABLE I

| Surfactant Concentration (ppm) | Planktonic P. aeruginosa | | Planktonic P. pickettii | |
|---|---|---|---|---|
| | LOG CFU/mL | Change Relative to Control | LOG CFU/mL | Change Relative to Control |
| 0 | 6.34 | — | 6.25 | — |
| 5 | 6.30 | −0.04 | 6.24 | −0.01 |
| 12 | 6.30 | −0.04 | 6.16 | −0.09 |
| 24 | 6.43 | 0.09 | 6.09 | −0.16 |
| 36 | 6.42 | 0.08 | 6.07 | −0.18 |
| 48 | 6.51 | 0.17 | 6.13 | −0.12 |

Note that the present invention may also be effective on surfaces other than stainless steel, e.g., acrylic, ceramic or metal surfaces. Furthermore, other aqueous systems, such as metal working and oil and gas systems will also benefit from the present invention.

The preferred embodiment of the present invention (i.e., the dinonylsulfosuccinate sodium salt) was also tested in a side-stream device at an alkaline fine paper mill. The test was conducted using a side-stream device that allowed for the concurrent sampling of both control and treated surfaces and associated bulk-phase water. The treatment was continually fed into the test system in order to maintain a constant concentration of 48 ppm (active) in the white water. Surface colonization was monitored by chemically determining the amount of biomass on a given surface.

Figure 3:
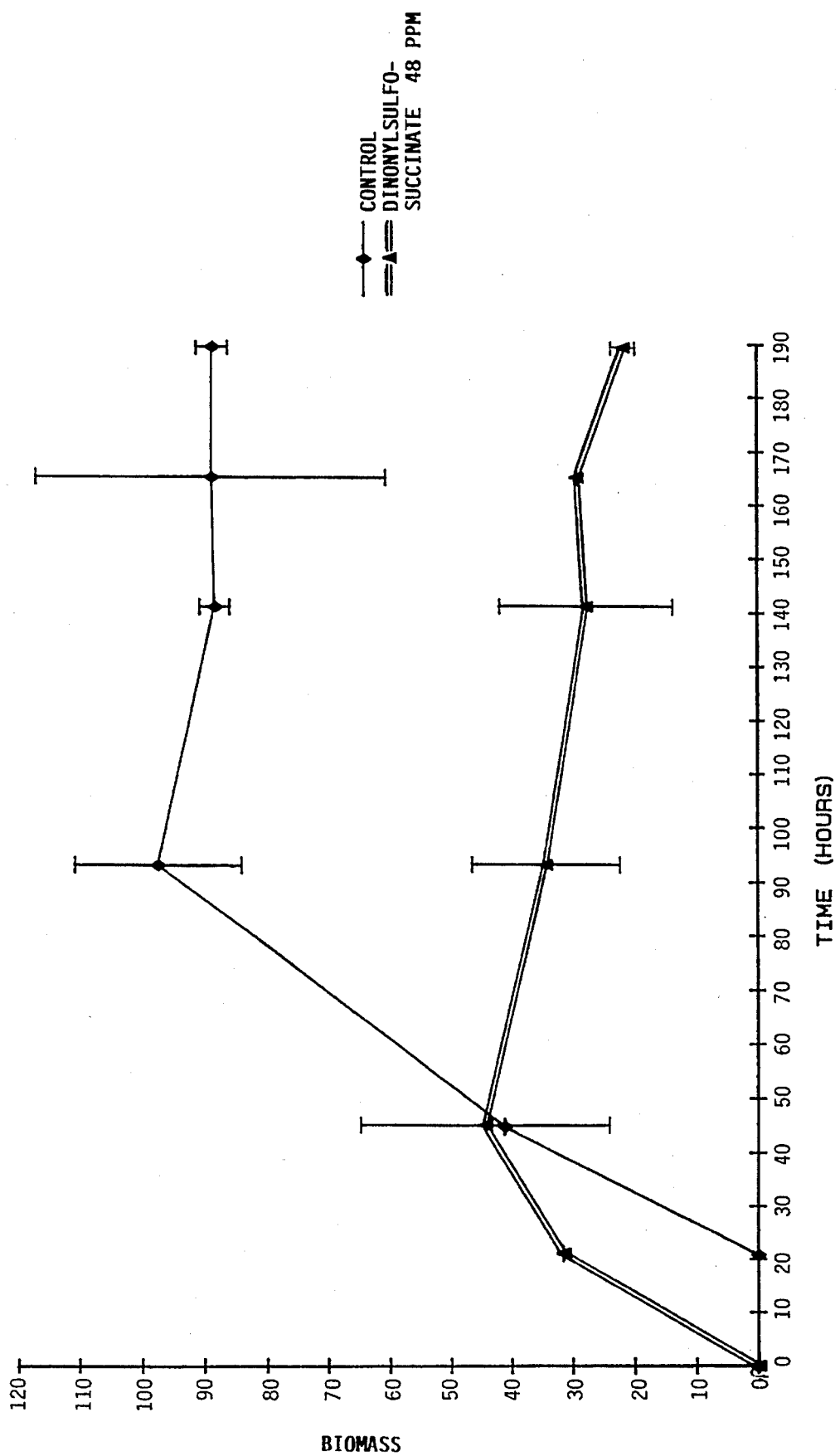
FIG. 3 illustrates surface colonization at an alkaline fine paper mill. Biomass is in nanograms (ng)/cm$^2$.

As shown in FIG. 3, there was a significant difference in the amount of biomass and overall deposit formation on the control vs. test devices. The surfaces exposed to treated water were essentially free of any detectable deposit, while surfaces exposed to the control water had very evident build-up.

The same protocol was repeated, using 12 ppm of the preferred product, and similar results were obtained. Epifluorescent examination of the surfaces (treated and control) demonstrated that the control surfaces had a significantly greater degree of bacterial colonization than the treated surfaces. However, 12 ppm of the preferred product did, of course, allow more bacterial colonization to occur than the 48 ppm treatment regimen. A visual and tactile inspection of the test system demonstrated that 12 ppm of the preferred product continued to demonstrate efficacy at keeping the surfaces visually free of deposit. It is expected that amounts of the treatment of the present invention as low as from about 1–5 ppm may be effective, depending upon the characteristics of the treated system, e.g., bacterial load.

Additional results of colonization inhibition experiments carried out with various molecules encompassed by the present invention are found in Table II, below.

TABLE II

| Surfactant | Concentration mg/L | Colonization % of Control |
|---|---|---|
| DNSS | 0 | 100 |
| | 5 | 100 |
| | 15 | 28.6 |
| | 25 | 26.4 |
| | 50 | 10.2 |
| DOSS | 0 | 100 |
| | 5 | 100 |
| | 15 | 61.1 |
| | 25 | 15.1 |
| | 50 | 13.5 |
| DDSS | 0 | 100 |
| | 5 | 100 |
| | 15 | 71.3 |
| | 25 | 33.7 |
| | 50 | 30 |

DNSS - Dinonylsulfosuccinate
DOSS - Dioctylsulfosuccinate
DDSS - Didecylsulfosuccinate As noted above, various dialkylsulfosuccinate surfactants show efficacy in the control of microbial colonization. Depending on the particular alkylsulfosuccinate surfactant chosen for treatment, the concentration of material needed to achieve efficacy may vary.

While we have shown and described herein certain embodiments of the present invention, it is intended that there be covered as well any change or modification therein which may be made without departing from the spirit and scope of the invention.

We claim:

1. A method for inhibiting the microbial colonization of surfaces in contact with an aqueous system which comprises adding to said system an effective amount of an alkylsulfosuccinate surfactant, said method substantially preventing the adhesion of microbes to said surfaces while preserving the viability of the microbes in said system, allowing for the discharge of the microbes from said system.

2. The method as recited in claim 1 wherein said alkylsulfosuccinate surfactant is a dialkylsulfosuccinate.

3. The method as recited in claim 1 wherein at least about 0.5 ppm of said surfactant is added to the aqueous system.

4. The method as recited in claim 2 wherein said dialkylsulfosuccinate is a dioctylsulfosuccinate.

5. The method as recited in claim 2 wherein said dialkylsulfosuccinate is a didecylsulfosuccinate.

6. The method as recited in claim 1 wherein said aqueous system comprises a cooling water system.

7. The method as recited in claim 1 wherein said surfaces are acrylic, ceramic or metal.

8. The method as recited in claim 1 wherein said aqueous system comprises a pulping or papermaking system.

9. The method as recited in claim 1 wherein said aqueous system comprises a metal working system.

10. The method as recited in claim 1 wherein said aqueous system comprises an oil and gas system.

11. A method for inhibiting the microbial colonization of surfaces in contact with an aqueous system which comprises adding to said system an effective amount of a dialkylsulfosuccinate surfactant, said method substantially preventing the adhesion of microbes to said surfaces while preserving the viability of the microbes in said system, allowing for the discharge of the microbes from said system.

12. The method as recited in claim 11 wherein at least about 0.5 ppm of said surfactant is added to the aqueous system.

13. The method as recited in claim 11 wherein said dialkylsulfosuccinate surfactant is a dioctylsulfosuccinate.

14. The method as recited in claim 11 wherein said dialkylsulfosuccinate surfactant is a didecylsulfosuccinate.

15. The method as recited in claim 11 wherein said aqueous system comprises a cooling water system.

16. The method as recited in claim 11 wherein said surfaces are acrylic, ceramic or metal.

17. The method as recited in claim 11 wherein said aqueous system comprises a pulping or papermaking system.

18. The method as recited in claim 11 wherein said aqueous system comprises a metal working system.

* * * * *